United States Patent [19]
Pan

[11] Patent Number: 5,636,053
[45] Date of Patent: Jun. 3, 1997

[54] FIBEROPTIC AMPLIFIER SYSTEM WITH NOISE FIGURE REDUCTION

[75] Inventor: Jing-Jong Pan, Milpitas, Calif.

[73] Assignee: E-Tek Dynamics, Inc., San Jose, Calif.

[21] Appl. No.: 490,938

[22] Filed: Jun. 15, 1995

[51] Int. Cl.$^6$ ........................................................ H01S 3/00
[52] U.S. Cl. ............................................. 359/341; 359/337
[58] Field of Search ...................................... 359/341, 337

[56] References Cited

U.S. PATENT DOCUMENTS

| | | | |
|---|---|---|---|
| 5,295,015 | 3/1994 | Yoneyama | 359/333 |
| 5,303,314 | 4/1994 | Duling, III et al. | 385/11 |
| 5,361,161 | 11/1994 | Baney et al. | 359/337 |
| 5,471,334 | 11/1995 | Masuda et al. | 359/177 |
| 5,526,174 | 6/1996 | Saito | 359/337 |

*Primary Examiner*—Mark Hellner
*Attorney, Agent, or Firm*—Townsend and Townsend and Crew LLP

[57] ABSTRACT

A fiberoptic amplifier system having an optical amplifier, which receives an input signal and generates an amplified signal and amplified spontaneous emission noise, and a variable polarization beam splitter, which receives the amplified signal and amplified spontaneous emission noise from the optical amplifier. The amplified spontaneous emission (ASE) noise is a broadband optical noise with a random polarization state in a rare earth-doped fiber optical amplifier. In a semiconductor laser diode optical amplifier, the ASE noise is partially polarized depending upon the waveguide structure of the laser diode. In the rare earth-doped fiber optical amplifier noise figure reduction configuration, the variable polarization beam splitter is responsive to the polarization of the amplified input signal to split one-half of the amplified spontaneous emission noise away from the amplified input signal and remaining one-half of the amplified spontaneous emission noise into a first port and the amplified input signal and the remaining one-half of the amplified spontaneous emission noise passes to an output port. This significantly reduces the noise figure of the fiberoptic amplifier system.

22 Claims, 2 Drawing Sheets

FIBEROPTIC AMPLIFIER SYSTEM WITH NOISE FIGURE REDUCTION

BACKGROUND OF THE INVENTION

The present invention is related to the field of fiberoptic networks and, more particularly, to noise reduction techniques for lasing optical amplifiers.

In fiberoptic networks and transmission systems, optical amplifiers are used to boost message signals. Lasing optical amplifiers, such as laser diodes or rare earth-doped fiber amplifiers, are often used. However, a problem which exists in all information transmission systems is noise. The noise figure of a fiberoptic amplifier is the ratio of the signal-to-noise ratio at the input in the frequency band of interest to the signal-to-noise ratio at the output in the same band, i.e., $$NF = (S/N)_{in}/(S/N)_{out}$$
$$= (N_{out})/(N_{in})/G$$

where G is the amplifier gain. The noise figure is used to measure the amount of noise added by the amplifier. In lasing optical amplifiers, a large component of the noise generated within the amplifier is amplified spontaneous emission, or ASE.

One widely used technique to filter out the broad band ASE is the incorporation of a narrow linewidth optical band pass filter. This technique yields a typical noise figure reduction of 0.5 dB but suffers from a 3 dB insertion loss. Furthermore, this technique appears to be incompatible with wideband multi-signal systems.

In contrast, the present invention offers a fiberoptic amplifier system with a superior noise figure reduction.

SUMMARY OF THE INVENTION

The present invention provides for a fiberoptic amplifier system having an optical amplifier, which receives an input signal and generates an amplified signal and amplified spontaneous emission noise. The fiberoptic amplifier system also has a variable polarization beam splitter, which receives the amplified signal and amplified spontaneous emission noise from the optical amplifier. The amplified spontaneous emission (ASE) noise is a broadband optical noise with a random polarization state in a rare earth-doped fiber optical amplifier. In a semiconductor laser diode optical amplifier, the ASE noise is partially polarized depending upon the waveguide structure of the laser diode. In the rare earth-doped fiber optical amplifier noise figure reduction configuration, the variable polarization beam splitter is responsive to the polarization of the amplified input signal to split one-half of the amplified spontaneous emission noise away from the amplified input signal and remaining one-half of the amplified spontaneous emission noise into a first port and the amplified input signal and the remaining one-half of the amplified spontaneous emission noise passes to an output port. This significantly reduces the noise figure of the fiberoptic amplifier system.

The fiberoptic amplifier system also has a tap coupler and a photodiode to monitor the light intensity at one of the ports, and a control unit responsive to the photodiode for controlling the variable polarization beam splitter such that the light intensity at the output port is maximized.

DETAILED DESCRIPTION OF PREFERRED EMBODIMENT(S)

Figure 1:
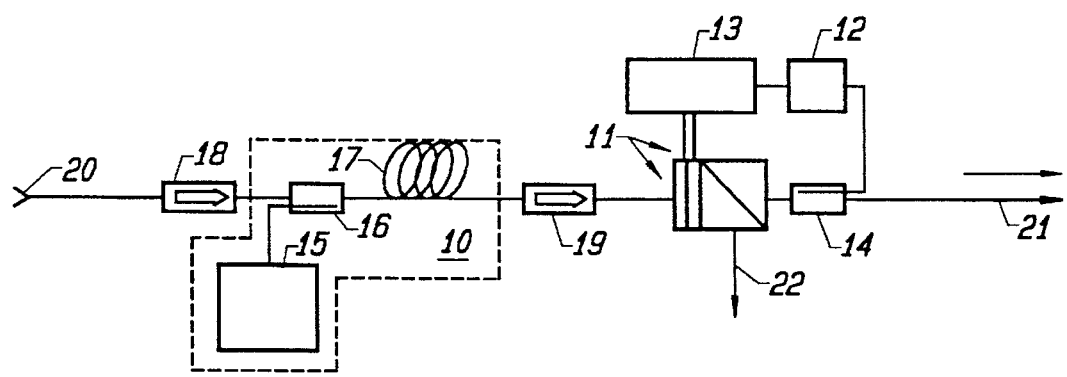
FIG. 1 is a representational diagram of a fiberoptic amplifier system having a doped optical fiber as part of the optical amplifier in accordance with one embodiment of the present invention.

FIG. 1 illustrates one embodiment of the present invention. The illustrated fiberoptic amplifier system has an input port 20 through which a message signal is received. The message signal is amplified by a single-pumped lasing optical amplifier 10. Optical isolators 18 and 19 respectively protect the input port 20 and the optical amplifier 10 from errant reflections. Arrow symbols indicate the transmission direction of the optical isolators 18 and 19. In the process of amplification, the optical amplifier 10 generates an amplified spontaneous emission (ASE) noise. Besides the message signal, the optical amplifier 10 also amplifies noise which has been generated within the amplifier, i.e., ASE.

To reduce ASE, the signal and noise from the amplifier 10 is received by a variable polarization beam splitter 11. Responsive to the state of polarization of the signal from the amplifier 10, the variable polarization beam splitter 11 splits the received signal and noise into two parts. One part, including the signal and one-half the ASE noise, is sent to an output port 21 and the other part, the other half of the ASE noise, is sent to a monitoring port 22.

A control circuit 13 forms part of a feedback loop for an automated response to the state of polarization of the signal from the amplifier 10. In the path of the output port 21, a coupler 14 is placed to tap some of the light being sent to the output port 21. The tapped light signals are sent to a photodiode 12, which generates an electrical signal corresponding to the intensity of the light signal to the output port 21. The electrical signal is sent to the control circuit 13. The control circuit 13 is connected to liquid crystal cells, described below, of the variable polarization beam splitter 11. The liquid crystal cells in response to signals from the control circuit 13 are adjusted so that one-half of the ASE output generated by the optical amplifier 10 is split into the monitoring port 22. What remains, the amplified message signal and the remaining half of the ASE output, is sent to the output port 21.

Figure 2:
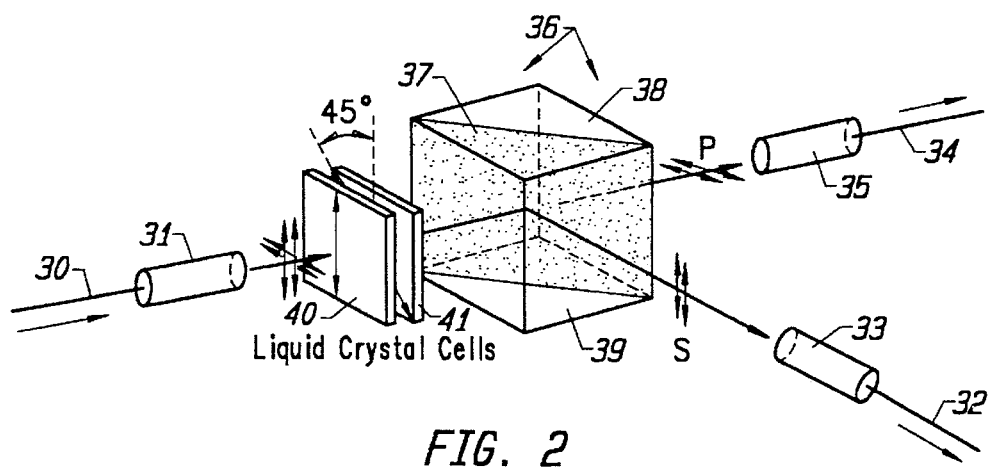
FIG. 2 is a more detailed view of the variable polarization beam splitter of FIG. 1.

FIG. 2 illustrates the variable polarization beam splitter 11 in further detail. The splitter 11 has a polarization beam splitter cube 36 formed by a pair of right angle prisms 38 and 39. The face of the hypotenuse of one prism 38 is bonded to the hypotenuse face of the second prism 39 with special dielectric materials to form a polarizing beam splitter cube 36 with an internal interface 37 at an angle 45° to the external faces of the cube.

Incoming light which travels perpendicularly to one of the external faces is transmitted through the interface or reflected at the interface 90° to the incoming light according to the polarization of the light. Light which is linearly polarized in the plane of incidence is transmitted through the cube. Light which is linearly polarized perpendicularly to the plane of incidence is reflected by the cube. Thus the cube 36 splits the input light into a P-component and an S-component depending upon the state of polarization of the signal from the fiber 30. These two polarized and split beams are at 90° from each other. The P-component beam which passes straight through the cube 24 is linearly polarized in the plane of incidence at the interface. The S-component beam which emerges from the cube at right angles to the incident beam is linearly polarized orthogonal to the plane of incidence.

The splitter cube 36 is optically connected to an input optical fiber 30 and two output optical fibers 32 and 34. The end of the input fiber 30 terminates in a collimator subassembly 31 which directs the optical signals from the fiber 30 toward a pair of liquid crystal cells 40 and 41. The two output fibers 32 and 34 are terminated by collimator subassemblies 33 and 35 respectively. Like the collimator subassembly 31 for the input fiber 30, each subassembly 33 and 35 holds the end of its respective optical fiber 32 and 34 in a coaxial relationship with a collimator, either a standard lens or a GRIN lens. Alternatively, the subassemblies 31, 33 and 35 could be fiber-pigtailed collimators. While standard lenses could also be used as collimators, it has been found that quarter-pitch GRIN(GRaded INdex) lenses provide better performance, easier manufacturing and greater durability. More detailed information on the manufacture of these GRIN lens/optical fiber subassemblies may be found in U.S. Pat. No. 5,208,876 entitled, "AN IMPROVED OPTICAL ISOLATOR", which issued on May 4, 1993 to J. J. Pan and assigned to the present assignee.

The front faces of the GRIN lens of each assembly 33 and 35 is arranged so that light reflected off the interface 37 is received by the GRIN lens collimator of the subassembly 33 and light transmitted through the interface 37 is received by the GRIN lens collimator of the subassembly 35. The subassembly 11 for the input fiber 10 faces the subassembly 35 for the output fiber 34, while the subassembly 33 for the output fiber 32 faces the interface 37 at a right angle to the line between the two subassemblies 31 and 35.

The liquid crystal cells 40 and 41, depending upon the control signals imposed upon the cells, can rotate the polarization of the incoming light signal from the fiber 30. Thus, the action of the cells 40 and 41 are such that the polarization of the polarized light from the input fiber 30 can be rotated after passing through the cells 40 and 41. The two liquid crystal cells 40 and 41 have their optical axes arranged at 45° with respect to each other. Instead of rotating the optical axis of a single liquid crystal cell, the axes of the two liquid crystal cells are rotated together to maintain the 45° angle. The orientation of the incoming polarized light to the splitter cube 36 is controlled by the orientations of the optical axes of the two liquid crystal cells 40 and 41.

The surfaces of the cells 40 and 41 facing the first GRIN lens subassembly 31 is coated with anti-reflection coating for better performance. Further details of liquid crystal cell technology and its manufacture, which may be used for the cells 40 and 41, may be found in U.S. Pat. No. 5,276,747, which issued Jan. 4, 1994 to J. J. Pan and assigned to the present assignee.

The output from the lasing optical amplifier 10 has basically two components, the amplified message signal which is elliptically polarized and the ASE noise which is almost randomly polarized in the fiberoptic amplifier. The first liquid crystal cell 40 defines the input signal polarization orientation and the second liquid crystal cell 41 adjusts the polarization state so that the beam splitter cube 36 splits the message signal and one-half of the ASE noise power into the output port 21 and the other half of the ASE power into the monitoring port 22. No matter what the polarization state of the incoming signal, the polarization beam splitter 36 always splits the randomly polarized ASE noise into halves of equal power.

The control circuit 13 is designed so that the phase retardances of the liquid crystal cells 40 and 41 change to maximize the signal to the output port 21. These phase retardances change the elliptically polarized signal into a linearly polarized signal and pass that signal to the output port 21. This is done by the control circuit 13 which maximizes the light intensity received by the photodiode 12 by a dithering technique, well-known to electronic circuit designers.

Alternatively, if the coupler 14 were tapping the light intensity of the monitoring port 22, then the control circuit 13 generates control signals to the liquid crystal cells 40 and 41 to minimize the light intensity received by the photodiode 12. The monitoring port 22 can also be used for monitoring the noise figure to stabilize the operation of the lasing optical amplifier 10. This is particularly useful when the amplifier is a doped fiber amplifier as illustrated by FIG. 1.

As shown in FIG. 1, the lasing optical amplifier 10 is in the form by a doped fiber 17. Rare earth dopants, typically erbium (Er), praseodymium (Pr), or neodymium, are used. The doped fiber 17 is pumped by a laser 15 through a wavelength division multiplexing fiberoptic coupler 16. Alternatively, the lasing optical amplifier 10 could be a semiconductor laser diode connected directly between the optical isolators 18 and 19.

Figure 3A:
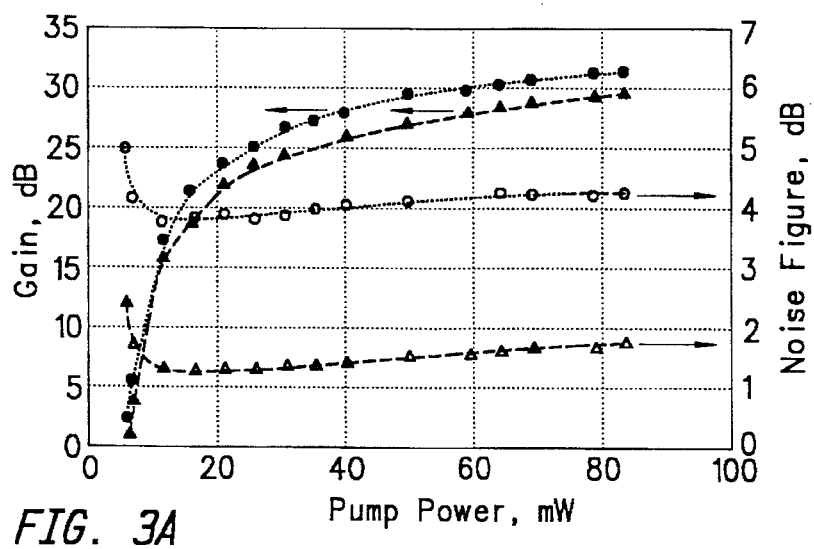
FIG. 3A is a comparison graph showing the gain versus the pump power and the noise figure versus the pump power with and without the operation of the variable polarization beam splitter in the fiberoptic amplifier system of FIG. 1.
Figure 3B:
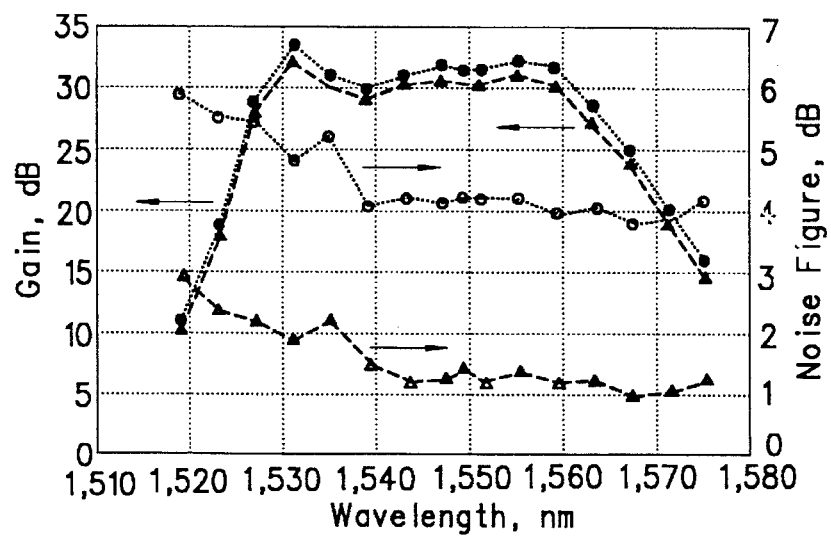
FIG. 3B is another comparison graph showing the gain versus wavelength and the noise figure versus the wavelength with and without the operation of the variable polarization beam splitter in the fiberoptic amplifier system of FIG. 1.

FIGS. 3A and 3B illustrates the results of one embodiment of the present invention. A 980 nm diode laser is used with an erbium-doped fiber amplifier for the lasing optical amplifier 10. The circles indicate the data points of the output of the optical amplifier 10 without the operation of the present invention and the triangular symbols indicate data points with the operation of the present invention.

In FIG. 3A the power of the pump laser 15 is varied and the signal wavelength measured at 1549.38 nm. As can be seen, when the ASE noise power is reduced by a half, the noise figure of the optical amplifier 10 is correspondingly reduced by 3 dB. Only a small signal gain compression of approximately 1.4 dB results, due to the insertion loss of the variable polarization beam splitter 11 and the residual polarization mismatch caused by adjustment error. Only a small amount of the amplified message signal is split into the monitoring port. The monitoring port has only 1.4 dB signal in contrast to the 30 dB signal at the output port. This technique results in a typical noise figure of less than 1.7 dB and increases slightly with an increase in pump power.

In FIG. 3B the pump power is maintained at 80 mW with signal wavelengths varying in a wide range between 1519–1572 nm. A noise figure reduction of 3 dB is again achieved.

In place of the beam splitter cube 36, birefringent crystals and laminated polarization beam splitter plates can also be used in the fiberoptic amplifier system of FIG. 1. These optical elements refract light according to the light's polarization. Refraction by different indices of refraction separate the differently polarized light as they leave the birefringent crystal or laminated polarization beam splitter plate. A detailed description of variable polarization beam splitters with birefringent crystals and laminated polarization beam splitter plates, as well as polarization beam splitter cubes, is found in U.S. application Ser. No. 08/406,212, entitled "VARIABLE POLARIZATION BEAM SPLITTER, COMBINER AND MIXER", filed Feb. 22, 1995 by J. J. Pan and assigned to the present assignee.

Figure 4A:
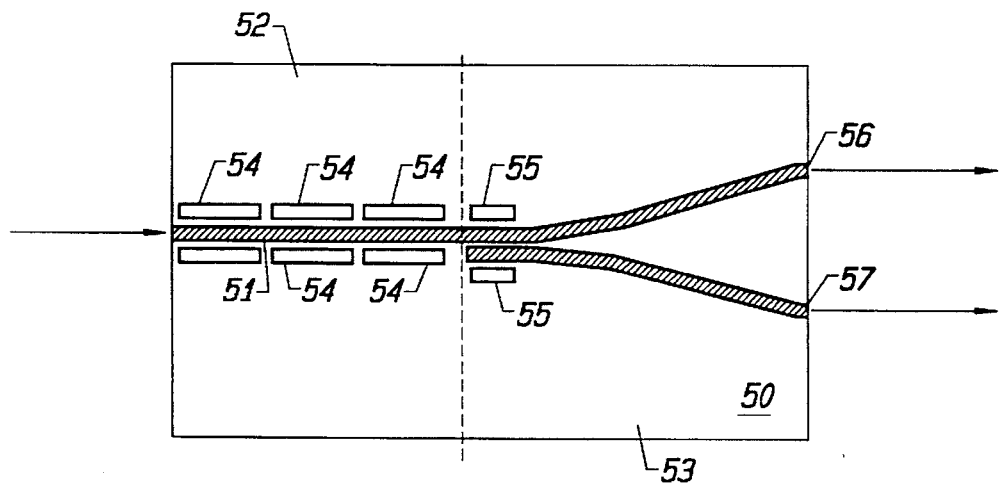
FIG. 4A is a representational diagram of a waveguide variable polarization beam splitter suitable for the variable polarization beam splitter of FIG. 1.
Figure 4B:
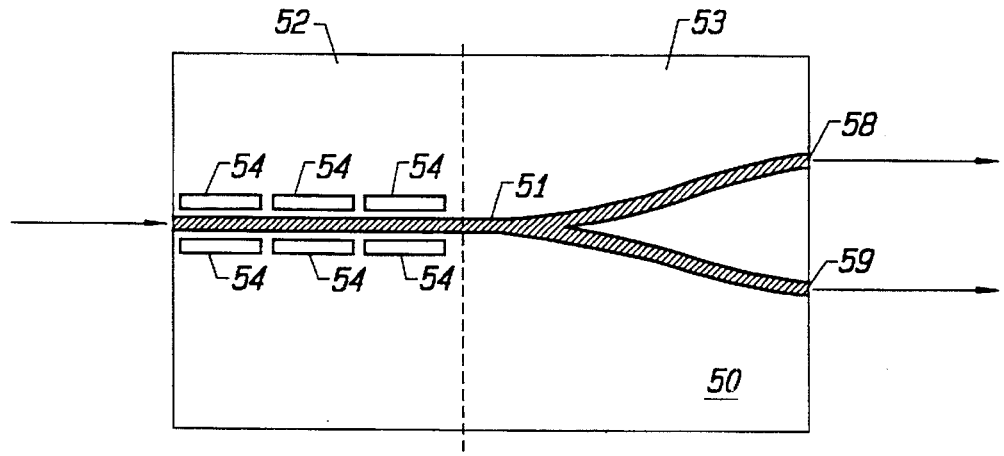
FIG. 4B is a representational diagram of another variable polarization beam splitter suitable for the variable polarization beam splitter of FIG. 1.

Besides a variable polarization beam splitter 11 as described above, waveguide-type variable polarization beam splitters can be used in the present invention. FIGS. 4A and 4B illustrate this type of variable polarization beam splitter. The splitter is formed by a waveguide 51 in a substrate 50, such as that of lithium niobate. One half of the splitter is an endless polarization controller 52; the remaining half of the splitter, separated by a dotted line, is a polarization splitter 53. The endless polarization controller 52 has electrodes 54 on either side of the waveguide 51. The electrodes 54 are connected to the control circuit 13 of FIG. 1 to control the state of polarization of the incoming signal from the amplifier 10.

The polarization splitter of FIG. 4A has a pair of biased electrodes 55 and a directional coupler with two ports 56 and 57. One of these is selected as the output port and the other the monitoring port. The polarization splitter of FIG. 4B has a Y-junction with two ports 58 and 59. Again one of these ports is selected to be the output port and the other the monitoring port.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. A fiberoptic amplifier system comprising an optical amplifier receiving an input signal and generating an amplified input signal and an amplified spontaneous emission noise;

a variable polarization beam splitter receiving said amplified signal and amplified spontaneous emission noise from said optical amplifier, said variable polarization beam splitter responsive to polarization of said amplified input signal to split one-half of said amplified spontaneous emission noise away from said amplified input signal and one-half of said amplified spontaneous signal into a first port, said amplified input signal and one-half of said amplified spontaneous emission noise passing to an output port, said variable polarization beam splitter having a first collimator subassembly holding an end of a first optical fiber in coaxial relationship with a first collimator, said first optical fiber carrying said amplified input signal and said amplified spontaneous emission noise from said optical amplifier;

a second collimator subassembly holding an end of a second optical fiber in coaxial relationship with a second collimator, said second optical fiber connected to said output port;

a third collimator subassembly holding an end of a third optical fiber in coaxial relationship with a third collimator, said third optical fiber connected to said first port;

means for directing light from said first collimator subassembly toward said second collimator subassembly or third collimator subassembly responsive to the polarization of said light signals from said first collimator subassembly; and first and second liquid crystal cells are interposed between said first collimator subassembly and said directing means, each of said liquid crystal cells having an optical axis at 45° with respect to the other, said cells controllably rotating the polarization of light from said first collimator subassembly toward said directing means responsive to control signals;

a means for monitoring light intensity at one of said ports;

a control unit responsive to said monitoring means for controlling said variable polarization beam splitter such that light intensity at said output port is maximized;

whereby a noise figure of said fiberoptic amplifier system is reduced.

2. The fiberoptic amplifier system of claim 1 wherein said optical amplifier comprises a doped fiber.

3. The fiberoptic amplifier system of claim 2 wherein said doped fiber comprises an erbium-doped fiber.

4. The fiberoptic amplifier system of claim 1 wherein said optical amplifier comprises a semiconductor laser diode.

5. The fiberoptic amplifier system of claim 1 wherein said light intensity monitoring means comprises a photodiode.

6. The fiberoptic amplifier system of claim 1 wherein said directing means comprises first and second prisms, each prism having a hypotenuse face, and first and second faces forming a right angle with each other, said hypotenuse face forming an interface with the other hypotenuse face of the other prism, said first collimator subassembly aligned substantially perpendicularly to a first face of said first prism, said second collimator subassembly aligned substantially perpendicularly to a second face of said first prism, and said third collimator subassembly aligned substantially perpendicularly to a first face of said second prism.

7. The fiberoptic amplifier system of claim 1 wherein said directing means comprises a birefringent crystal.

8. The fiberoptic amplifier system of claim 1 wherein said directing means comprises a laminated beam splitter plate.

9. The fiberoptic amplifier system variable polarization beam splitter of claim 1 wherein said second and third collimator subassemblies each comprises a quarter-pitch GRIN lens.

10. The fiberoptic amplifier system of claim 1 wherein said variable polarization beam splitter comprises a wave guide type having a endless polarization controller section and a polarization splitter section.

11. The fiberoptic amplifier assembly of claim 10 wherein said polarization splitter section comprises a directional coupler.

12. The fiberoptic amplifier assembly of claim 10 wherein said polarization splitter section comprises a Y-junction.

13. The fiberoptic amplifier system of claim 1 wherein said monitoring means monitors light intensity at said first port, and said control unit controls said variable polarization beam splitter so that light intensity at said first port is minimized.

14. A fiberoptic amplifier system comprising an optical amplifier receiving an input signal and generating an amplified input signal and an amplified spontaneous emission noise;

a variable polarization beam splitter receiving said amplified signal and amplified spontaneous emission noise from said optical amplifier, said variable polarization beam splitter responsive to polarization of said amplified input signal to split one-half of said amplified spontaneous emission noise away from said amplified input signal and one-half of said amplified spontaneous signal into a first port, said amplified input signal and one-half of said amplified spontaneous emission noise passing to an output port, said variable polarization beam splitter having a first collimator subassembly holding an end of a first optical fiber in coaxial relationship with a first collimator, said first optical fiber carrying said amplified input signal and said amplified spontaneous emission noise from said optical amplifier;

a second collimator subassembly holding an end of a second optical fiber in coaxial relationship with a second collimator, said second optical fiber connected to said output port;

means for directing light from said first collimator subassembly toward said second collimator subassembly responsive to the polarization of said light signals from said first collimator subassembly; and first and second liquid crystal cells are interposed between said first collimator subassembly and said directing means, each of said liquid crystal cells having an optical axis at 45° with respect to the other, said cells controllably rotating the polarization of light from said first collimator subassembly toward said directing means responsive to control signals;

a means for monitoring light intensity at said output port;

a control unit responsive to said monitoring means for controlling said variable polarization beam splitter such that light intensity at said output port is maximized;

whereby a noise figure of said fiberoptic amplifier system is reduced.

15. The fiberoptic amplifier system of claim 14 wherein said directing means comprises first and second prisms, each prism having a hypotenuse face, and first and second faces forming a right angle with each other, said hypotenuse face forming an interface with the other hypotenuse face of the other prism, said first collimator subassembly aligned substantially perpendicularly to a first face of said first prism, said second collimator subassembly aligned substantially perpendicularly to a second face of said first prism, and said third collimator subassembly aligned substantially perpendicularly to a first face of said second prism.

16. The fiberoptic amplifier system of claim 14 wherein said directing means comprises a birefringent crystal.

17. The fiberoptic amplifier system of claim 14 wherein said directing means comprises a laminated beam splitter plate.

18. The fiberoptic amplifier assembly of claim 14 wherein said variable polarization beam splitter comprises a wave guide type having an endless polarization controller section and a polarization splitter section.

19. The fiberoptic amplifier assembly of claim 18 wherein said polarization splitter section comprises a directional coupler.

20. The fiberoptic amplifier assembly of claim 18 wherein said polarization splitter section comprises a Y-junction.

21. A fiberoptic amplifier system comprising an optical amplifier receiving an input signal and generating an amplified input signal and an amplified spontaneous emission noise;

a variable polarization beam splitter receiving said amplified signal and amplified spontaneous emission noise from said optical amplifier, said variable polarization beam splitter responsive to polarization of said amplified input signal to split one-half of said amplified spontaneous emission noise away from said amplified input signal and one-half of said amplified spontaneous signal into a first port, said amplified input signal and one-half of said amplified spontaneous emission noise passing to an output port, said variable polarization beam splitter having a first collimator subassembly holding an end of a first optical fiber in coaxial relationship with a first collimator, said first optical fiber carrying said amplified input signal and said amplified spontaneous emission noise from said optical amplifier;

a second collimator subassembly holding an end of a second optical fiber in coaxial relationship with a second collimator, said second optical fiber connected to said output port;

a third collimator subassembly holding an end of a third optical fiber in coaxial relationship with a third collimator, said third optical fiber connected to said first port;

a light director located between said first, second and third collimator subassemblies, said light director directing light from said first collimator subassembly toward said second collimator subassembly or third collimator subassembly responsive to the polarization of said light signals from said first collimator subassembly; and first and second liquid crystal cells are interposed between said first collimator subassembly and said light director, each of said liquid crystal cells having an optical axis at 45° with respect to the other, said cells controllably rotating the polarization of light from said first collimator subassembly toward said light director means responsive to control signals;

a light intensity monitor at one of said ports;

a control unit responsive to said light intensity monitor for controlling said variable polarization beam splitter such that light intensity at said output port is maximized;

whereby a noise figure of said fiberoptic amplifier system is reduced.

22. A fiberoptic amplifier system comprising an optical amplifier receiving an input signal and generating an amplified input signal and an amplified spontaneous emission noise;

a variable polarization beam splitter receiving said amplified signal and amplified spontaneous emission noise from said optical amplifier, said variable polarization beam splitter responsive to polarization of said amplified input signal to split one-half of said amplified spontaneous emission noise away from said amplified input signal and one-half of said amplified spontaneous signal into a first port, said amplified input signal and one-half of said amplified spontaneous emission noise passing to an output port, said variable polarization beam splitter having a first collimator subassembly holding an end of a first optical fiber in coaxial relationship with a first collimator, said first optical fiber carrying said amplified input signal and said amplified spontaneous emission noise from said optical amplifier;

a second collimator subassembly holding an end of a second optical fiber in coaxial relationship with a second collimator, said second optical fiber connected to said output port;

a light director located between said first, and second collimator subassemblies, said light director directing light from said first collimator subassembly toward said second collimator subassembly responsive to the polarization of said light signals from said first collimator subassembly; and first and second liquid crystal cells are interposed between said first collimator subassembly and said light director, each of said liquid crystal cells having an optical axis at 45° with respect to the other, said cells controllably rotating the polarization of light from said first collimator subassembly toward said light director responsive to control signals;

a light intensity monitor at one of said ports;

a control unit responsive to said light intensity monitor for controlling said variable polarization beam splitter such that light intensity at said output port is maximized;

whereby a noise figure of said fiberoptic amplifier system is reduced.

* * * * *